United States Patent
Helton

[15] 3,661,315
[45] May 9, 1972

[54] MATERIAL REMOVING DEVICE

[72] Inventor: Charles J. Helton, Santa Ana, Calif.
[73] Assignee: North American Rockwell Corporation
[22] Filed: June 13, 1969
[21] Appl. No.: 833,046

[52] U.S. Cl. ........................... 228/20, 15/404, 15/405, 126/110, 219/236
[51] Int. Cl. ........................... B23k 1/00, B23k 5/22
[58] Field of Search .................. 15/404, 405; 126/110, 117; 228/19, 20; 219/230, 236

[56] References Cited

UNITED STATES PATENTS

| | | | |
|---|---|---|---|
| 3,515,330 | 6/1970 | Bronson et al. | 228/8 |
| 3,443,733 | 5/1969 | Parente | 228/20 |
| 3,422,247 | 1/1969 | Royston et al. | 219/230 |
| 3,239,124 | 3/1966 | Hathcock | 228/20 |
| 2,960,591 | 11/1960 | Brillinger | 219/230 X |
| 2,955,187 | 10/1960 | Campo | 228/20 |
| 2,650,615 | 9/1953 | Nesham | 15/404 X |
| 1,949,658 | 3/1934 | Remseth et al. | 15/405 X |

Primary Examiner—John F. Campbell
Assistant Examiner—R. J. Craig
Attorney—L. Lee Humphries

[57] ABSTRACT

An apparatus for removing material from a workpiece having a first source of heated gas and a second source of gas. The first and second gas sources are housed such that the two sources of gas are selectively dischargeable to heat and remove the material, materials, or materials and components from a workpiece.

24 Claims, 3 Drawing Figures

INVENTOR.
CHARLES J. HELTON

MATERIAL REMOVING DEVICE

BACKGROUND OF THE DISCLOSURE

This disclosure relates to the field of heated air gun equipment, and more particularly to the field of equipment with the capability of both soldering and desoldering as well as heating and removing many other kinds of materials.

The art of soldering is exemplary of particular uses of the device disclosed herein. Certainly many applications exist outside the art of soldering; however, the art of soldering is an old art and has an illuminating history. One of the problems that has always existed in any soldering or material removal situation is the removal of spare and excess solder or material from the workpiece or joint. A more recent problem, particularly in soldering, has been the removal of solder and components from high density circuit boards of modern day electronic equipment. In such situations the solder connections as well as the microminiature components being utilized in the circuits are quite tiny. The problem of removing these components for replacement by a good component, for rerun of the soldering or for salvage of useful parts presents several problems.

This disclosure describes a means for satisfactorily removing solder or other material from a printed circuit board or similar object without significant effect on related components or circuits. An early means for the removal of excess solder from a solder joint is described in U.S. Pat. No. 772,324 issued to O. S. Fellows on May 5, 1903. Fellows utilizes brushing of the soldered joint coupled with a flow of air across the solder joint to remove solder brushed loose during the brushing step. A more recent British patent issued to Barrens, et al., No. 875,398 of Aug. 16, 1961 describes an electrical means of heating a soldering iron plus an air blast means for removal of the heated solder. After the solder is heated and removed, the circuit component is free for removal from the workpiece.

Another patent of interest is U.S. Pat. No. 1,724,070 issued on Aug. 13, 1929 to Byrne et al. which describes the use of air pressure to force molten solder to the circuit joint. A patent issued on Mar. 11, 1930 to Emmert, U.S. Pat. No. 1,750,312, describes means for blowing away excess solder from a recently soldered area. Emmert first conducts molten solder to the piece being worked on and then blasting the soldered area with a flow of air removing any excess solder. U.S. Pat. No. 1,949,658 to Remseth et al., issued on Mar. 6, 1934, describes a scheme featuring inner heating coils to heat a stream of air from a gun. Remseth does not, however, use a blast of air for any removal of a solder.

A soldering iron that can pick up molten solder from the workpiece is described by Bleam et al. in his U.S. Pat. No. 2,609,778 issued Sept. 9, 1952. Bleam makes use of a flow of air across a nozzle that is located in the tip of the solder iron. The air flow causes a vacuum behind the tip of the solder iron. The vacuum causes molten solder to be sucked up a passageway in the soldering iron tip to a tube leading away from the soldering iron. Royston, et al. in his U.S. Pat. No. 3,422,247 issued Jan. 14, 1969 describes a device of interest for electrically heating a soldering area. Royston heats air that is subsequently directed to the solder to be melted, and once the solder has melted the molten is sucked up through the heating nozzle. Royston requires contact of the area to be heated with the heated tip at the end of the soldering iron for initial melting of the solder prior to suction pickup.

There are several shortcomings in all of the devices of the prior art whether the application is for removal of solder or other material. The prior art devices that provide for heating the solder or material prior to removal do not provide adequate means for removing the solder or material from the workpiece. The component desired to be removed must be picked up by use of pliers or tweezers. Those prior art devices that do utilize the heating of the solder or material and a blowing away of excess heated solder or material utilize a heating tip that must be in contact with the solder material, or workpiece to transmit its heat to it. This procedure causes dead blowaway zones as well as awkward viewing of the particular area desired to be prepared. Still further, those devices that use a suction for removal of excess solder or material suck the solder into the heating iron or auxillary cavity within the device. It is readily apparent that as the solder or material cools and adheres to the sides of the passageway such devices suffer from problems of clogging and fouling of the passageways leading to the removed solder or material cavity.

SUMMARY OF THE INVENTION

By means of the concept of the subject invention, heating and clearing of materials and components for all kinds of delicate workpieces is provided whereby the above-noted shortcomings of the prior art are avoided.

In an exemplary embodiment of the invention a first source of heated gas is provided as well as a selectively discharged second source of gas. Air is suitable for most applications as a gas but certain electronic applications may dictate the use of helium or other inert gas. In desoldering, for instance, the first source of gas is caused to discharge onto an area to be desoldered thereby heating the solder to a fluid state. The second source of gas is then discharged in blast fashion onto the previously heated area causing any heated solder to be blown away as well as the circuit component whose removal is desired. The flow of the second gas may be regulated to any desired length but a short blast has been shown to be most desirable. The area may also be cleared of epoxy, plastic, glue, low melting point metals, etc. in a similar fashion.

There is also provided a central housing area which houses heating coils. The first source of gas flows in said housing of the heating coils and achieves a temperature in excess of that of the melting point of the material to be removed. There is also provided means for insuring that the second source of blast gas is at a pressure in excess of the first source of heated gas.

There is still further provided means for interchanging nozzles on the instant device such that different gas flow patterns and blast patterns may be achieved for any desired clearing operation.

It is therefore an object of this invention to provide a means for heating a workpiece by use of directed heated gas.

It is a further object of this invention to provide means for removing materials and components utilizing heated gas and a blast of gas of short duration on the workpiece to remove the excess material and components.

Yet another object of this invention is to provide a material removing device with interchangeable nozzles such that different gas flow patterns and blast patterns may be achieved.

Still another object of this invention is to provide a material removing device wherein the removed material or components in no way comes in contact with the device.

These and other objects of the invention will become apparent from the specification, when taken together with the accompanying drawings in which:

BRIEF DESCRIPTION OF THE DRAWINGS

FIG. 3 is a sectional view of one embodiment of a collar for the introduction of gas to the inner cavity.

DESCRIPTION OF THE PREFERRED EMBODIMENT

Figure 1:
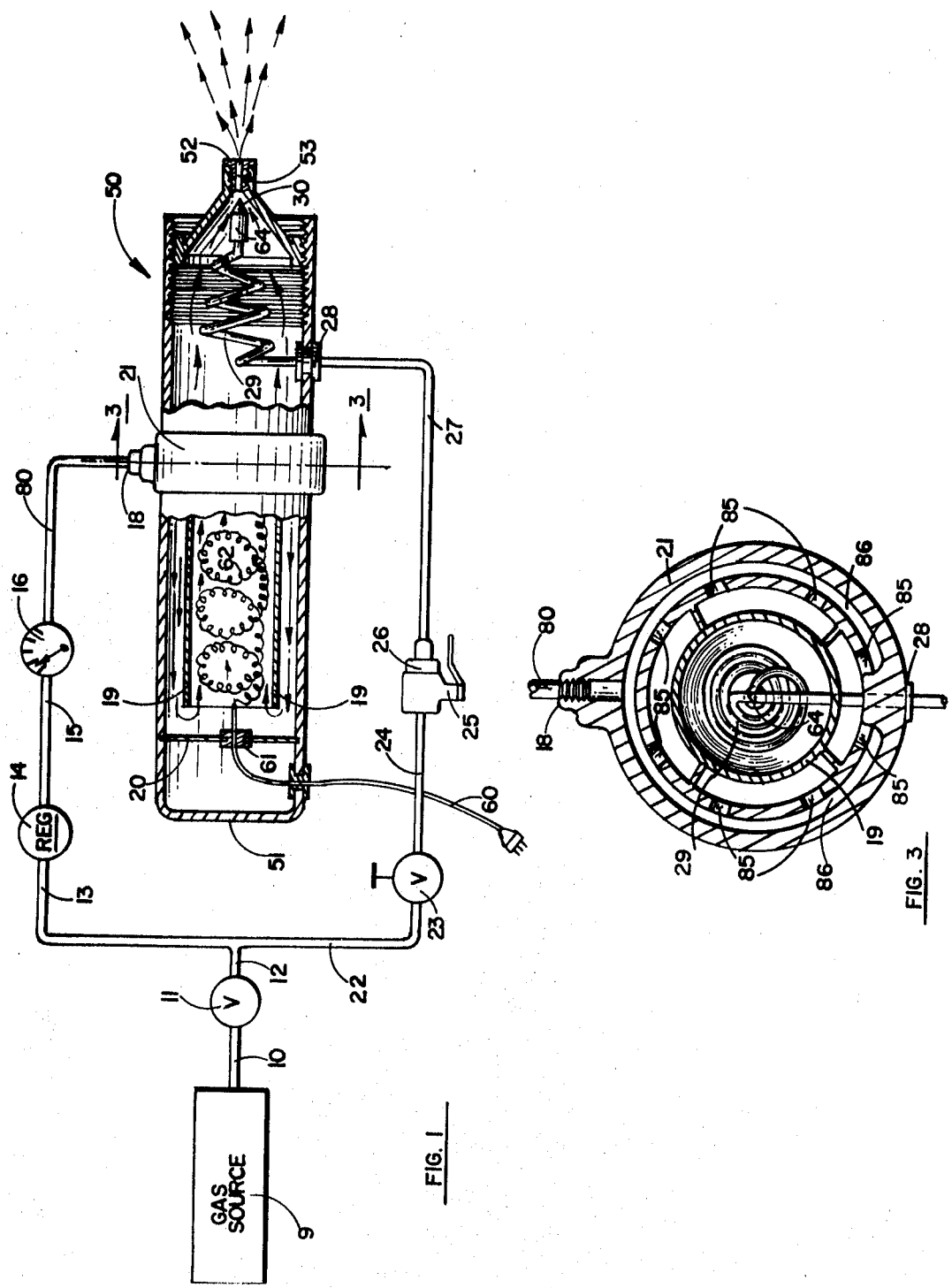
FIG. 1 is a sectional view taken along a center of the material removing device of this invention showing use of a central source of gas.

The material removal apparatus of the present invention incorporates the use of a gas at two different pressures. Gas from a first source is heated and directed onto a workpiece. The gas is controllably heated to a temperature greater than the melting temperature of the material to be removed. Once the material to be removed achieves a liquid state a blast of gas from a second source and at a pressure higher than the first source is selectively discharged to blow away the liquid material and any components previously held in place by the material.

Describing the invention more specifically, in an exemplary embodiment, a central source of gas 10 which may be "house pressure" or any convenient source of gas enters the device via valve 11 to T-junction 12. One outlet of T-junction 12 goes via piping 13 to regulator 14. The purpose of regulator 14 is to control the pressure of gas in the "low pressure," heated side of the device. The use of "low pressure" and later "high pressure" to refer to the separate gas piping systems is descriptive of the pressure of the gas in these systems as it flows in and leaves the material removal device. The pressure of the gas in both lines is, of course, identical until some valves and regulators are encountered in each piping system. Regulator 14 is connected via piping 15 to gage 16 such that an operator may visually set the desired low pressure using regulator 14. Low pressure gas from gage 16 is connected by pipe 80 to collar 21 of the material removing gun 50. Collar 21 may, for instance, have an inner channel that extends the circumference of collar 21 with openings 85 on the interior perimeter of the collar as shown in FIG. 3. In another embodiment, these openings may also be suitably aligned to preselectively positioned openings of the housing 51 of the material removing gun 50 to provide multiple access of the low pressure gas into the heating cavity such that the collar is completely exterior to the outer housing. The low pressure gas enters the collar 21 at junction 18. As has been previously stated, air would be the gas most commonly used in such an apparatus, but other gases may have special application in certain corrosive or reactive atmospheres.

The "high pressure" gas side of the material removal gun extends from T-valve junction 12 via pipe 22 to shut off valve 23 then via pipe 24 to valve 25. Valve 25 could be any valve that allows a surge of gas to pass such as a dumping valve. A quick opening valve is also quite satisfactory where a separate high pressure gas source is available. No gas leaves valve 25 until actuation of the valve. The valve when activated provides for a blast of high pressure gas of short duration. The duration of the flow of higher pressure gas may be regulated as desired. Sometimes a longer flow may be desired to achieve cooling of the workpiece but a blast of short duration is quite effective for material removal. Valve 25, if a dumping valve, for instance, has the capability of causing a blast of gas at the pressure of the gas source 9. Coupling 26 from the valve 25 couples high pressure gas line 27 to both the material removing gun 50 and the valve 25. The high pressure gas line 28 enters the material removing gun 50 at connection 28. A high pressure gas line 29 is internal to the material removing gun and connects the high pressure gas line from junction 28 to an orifice 30 in close proximity to nozzle opening 53. Of course, the high pressure gas could have a nozzle opening different than the heated low pressure gas opening; there are however applications where a single nozzle opening is desirable because alignment of only one opening is required.

Housing 51 defines a cylindrical cavity wherein are placed heating coils 62. Heating coils 62 receive electrical energy via cord 60 which functions with the heating coils at junction 61. Low pressure gas baffles 19 extend from close proximity to the low pressure gas collar 21 in order to discharge low pressure gas into the non-nozzle end of the cavity defined by cylinder 51. The low pressure gas then flows around heating coils 62 absorbing energy from these coils and thereby being heated as the low pressure gas flows through the material removing gun. The flow of gas is, of course, from the dumping end of the device 51 towards the nozzle exit 53. The preheating of the gas as it passes through coil 29 prevents sudden chilling of components and surrounding areas.

An interchangeable nozzle 52, located at the exit end of the material removing gun, provides for different air flow patterns and dumping orientations as desired for the particular application. Nozzle 52 contains passage 53 which in an exemplary embodiment as shown in FIG. 1 provides for the discharge of both the heated low pressure gas and the high pressure dumping gas.

In an exemplary desoldering sequence of operation, heating coils 62 are energized and allowed to heat for a short period of time. Gas is then supplied to the device by opening valve 11 and regulator 14 adjusted to provide low pressure gas to the material removing gun. In actual operation, low pressure air at 2½ pounds per square inch has been used in a satisfactory manner. Gas is permitted to valve 25 by opening valve 23. As gas valve 11 is opened low pressure gas will commence to flow around collar 21 into the housing cavity via pipes 19. As a flow of gas is established, the low pressure gas flows over the coil 62 and is thereby heated. The low pressure gas which is now heated then flows around the high pressure gas coils 29 without significant detriment and out nozzle 53. Nozzle 53 is directed onto the workpiece on which is material to be removed. As the material such as solder, becomes molten, valve 25 is activated releasing a surge of high pressure gas that is discharged through nozzle 30 and then through nozzle 53 onto the workpiece. The blast of high pressure gas clears any molten material or solder and for sufficiently small components any components released from the workpiece. Operation in this manner will clean most holes of excess material and in most cases remove the components. Of course components that have not been blow completely clear of the workpiece may now be removed with tweezers or pliers. The process is applicable for removal of soldered components and solder as well as any other bonding and adhesive material that can be brought to a liquid state. Removed components if later found to be operable may be remounted and reused since the process described herein is not generally destructive to the component.

Figure 2:
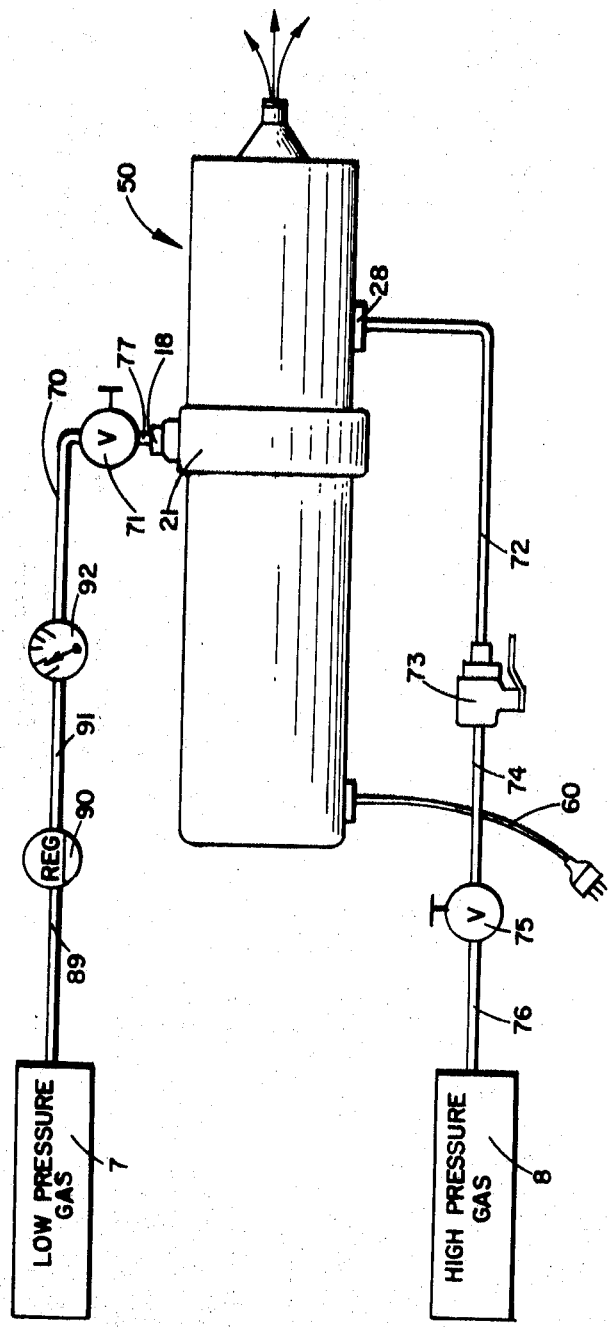
FIG. 2 is a schematic view showing the device with separate sources of gas.

FIG. 2 is a schematic representation of the disclosed material removing the device having separate sources of gas.

Low pressure gas source 7 is coupled to the material removing gun 50 by lines 89, 91, 70, and 77 with regulator 90, gage 92 and valve 71 interposed between lines 70 and 77. Valve 71 serves as a stop valve and regulator valve 90 serves to regulate the pressure and the flow of gas to the material removing gun 50. A pressure gage could also be interposed in the line between the low pressure gas source 7 and the material removing gun 50.

High pressure gas source 8 provides high pressure blast gas to the material removing device 50. Valve 75 is interposed in between lines 76 and 74 which are respectively attached to the high pressure gas source 8 and the control valve 73. Line 72 connects control valve 73 to the material removing gun 50. Valve 75 serves as a stop valve and a regulator valve to regulate the pressure of the high pressure gas available to the material removing gun 50. Operation of control valve 73 allows the high pressure gas to enter the material removing gun and then blast the workpiece as previously described in FIG. 1. A pressure gage may, if desired, be interposed in the line between the high pressure gas source 8 and the control valve 73 and between the control valve 73 and the material removing gun 50 if desired.

The internal workings of the material removing gun 50 depicted in FIG. 2 are as described for FIG. 1.

FIG. 3 is a sectional view of one embodiment of a collar for the introduction of gas to the inner cavity. Gas enters the collar from gas line 80 at junction 18 and then flows circumferentially through passageways 86 that are in the body of the collar. Spaced holes 85 provide access to the inner cavity of the material removing device from the circumferential passageways. Baffles 19 direct the gas to the non-nozzle end of the material removing device, and thus insures that the gas flows past the heating coils (see FIG. 1) of the device. Of course, the collar could be positioned at the non-nozzle end of the device and eliminate the need for the baffles as shown. Positioning of the collar is a matter of choice depending on space, balance and air flow requirements. An advantage of placing the collar nearer the front of the material removing gun is that the flow of gas through the length of the body helps pre-heat the gas and thus increases life of heating coils. In addition the time for "heat up" prior to use is reduced.

Accordingly, there has been described a novel device for removal of the components from modules by use of a material removing gas gun.

Although the invention has been described and illustrated in detail, it is to be clearly understood the same is by way of illustration and example only and is not to be taken by way of limitation, the spirit and scope of this invention being limited only by the terms of the appended claims.

I claim:

1. An apparatus for removing material from a workpiece comprising in combination:
   a. a housing defining an inner cavity therein;
   b. heating coils disposed in said cavity;
   c. means for coupling a first source of gas to said housing such that said gas enters said inner cavity and flows around said heating coils;
   d. a nozzle mounted to one end of said housing and defining a passage in communication with said inner cavity and the outside of said housing whereby said first source of gas is discharged from said inner cavity;
   e. means for coupling a second source of higher pressure gas to said housing;
   f. a passage communicating with said inner cavity and the outside of said housing whereby said second source of gas is discharged from said inner cavity.

2. The apparatus according to claim 1 and further comprising a valve operatively disposed in said second source of gas such that said second source of gas can be controllably released into said passageway.

3. The apparatus according to claim 1 wherein said passageway terminates in proximity to said nozzle such that said second source of gas is discharged through said nozzle.

4. The apparatus according to claim 1 wherein said nozzle is replaceably mounted to said housing such that nozzles defining orifices of varying configurations may be mounted to said housing to control the shape of the gas as it exits from said nozzle.

5. The apparatus according to claim 1 wherein said second source of gas is discharged from said inner cavity through said passage in said nozzle.

6. The apparatus according to claim 1 wherein said first source of gas is an air source.

7. The apparatus according to claim 1 wherein said second source of gas is an air source.

8. The apparatus according to claim 1 and further comprising:
   a. means for coupling to a central source of gas;
   b. a first connection from said means for coupling to a central source of gas to said means for coupling a first source of gas and having a regulator operably disposed in said connection; and
   c. a second connection from said means for coupling to a central source of gas to said means for coupling a second source of gas and having a dumping valve disposed in said second connection.

9. The apparatus according to claim 1 and further comprising means for selectively varying the current in said heating coils such that said gas from said first source of gas may be heated to selectively varied temperatures.

10. An apparatus for removing material from a workpiece comprising in combination:
    a. a housing defining an inner cavity therein;
    b. heating coils disposed in said cavity;
    c. a first source of pressurized gas attached through said housing such that said gas enters said inner cavity and flows around said heating coils;
    d. a nozzle mounted to one end of said housing and defining a passage in communication with said inner cavity and the outside of said housing whereby said first source of gas is discharged from said inner cavity through said nozzle;
    e. a second source of pressurized gas attached through said housing;
    f. a passage disposed in said inner cavity for said second source of gas said passage defining an orifice at the termination of said passage in close proximity to said nozzle whereby said second source of gas is discharged from said inner cavity in the same direction as the first gas is discharged through said nozzle.

11. The apparatus according to claim 10 and further comprising a valve operatively disposed in said second source of gas such that said second source of gas can be controllably released into said passageway.

12. The apparatus according to claim 10 wherein said passageway terminates in proximity to said nozzle such that said second source of gas is discharged through said nozzle.

13. The apparatus according to claim 10 wherein said second source of gas is at a pressure greater than the pressure of said first source of gas.

14. The apparatus according to claim 10 wherein said nozzle is replaceably mounted to said housing such that nozzles defining orifices of varying configurations may be mounted to said housing.

15. The apparatus according to claim 10 wherein said second source of gas is discharged from said inner cavity through said passage in said nozzle.

16. The apparatus according to claim 10 wherein said first source of gas is an air source.

17. The apparatus according to claim 10 wherein said second source of gas is an air source.

18. The apparatus according to claim 10 and further comprising:
    a. a central source of pressurized gas;
    b. a first connection from said central source of gas to said first source of gas and having a regulator operably disposed in said connection; and
    c. a second connection from said central source of gas to said second source of gas and having a dumping valve disposed in said second connection.

19. The apparatus according to claim 10 and further comprising means for selectively varying the current in said heating coils such that said gas from said first source of gas may be heated to selectively varied temperatures.

20. An apparatus for removing material from a workpiece comprising in combination:
    a. a first source of pressurized gas;
    b. an adjustable valve disposed in said first source of gas;
    c. a housing defining therein a cavity;
    d. a branch connection disposed after said adjustable valve, said branch forming second and third source of gas paths from said branch to said housing;
    e. an adjustable regulator interposed in the path of said second source of gas after said branch;
    f. heating coils disposed in said housing;
    g. ducting internal to said housing arranged to direct gas from said second source of gas around said heating coils;
    h. a nozzle mounted to one end of said housing, said nozzle defining a passageway therethrough;
    i. a dumping valve interposed in the path of said third source of gas after said branch;
    j. a passageway internal to said housing and attached to said housing where said third source of gas enters said housing, said passageway forming a conduit for said third source of gas in said housing.

21. The apparatus according to claim 20 wherein said housing defines a plurality of orifices and further comprising:
    a. a channelled coupling defining a plurality of gas passages, said channelled coupling interposed between said second source of gas and said housing and connecting said second source of gas to said housing such that said gas passages are aligned with said housing orifices;
    b. a plurality of ducting internal to said housing arranged to direct gas from said channelled coupling around said heating coils.

22. The apparatus according to claim 20 and wherein said nozzle is replaceably attached to said housing.

23. The apparatus according to claim 20 and further comprising a second adjustable valve interpose in said third source of gas between said branch and said dumping valve.

24. The apparatus according to claim 20 wherein said second source of gas is discharged from said inner cavity through said passage in said nozzle.

* * * * *